May 15, 1928.

O. JUNGGREN

SHAFT PACKING

Filed Sept. 29, 1924

1,670,071

Inventor:
Oscar Junggren,
by
His Attorney.

Patented May 15, 1928.

1,670,071

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

SHAFT PACKING.

Application filed September 29, 1924. Serial No. 740,463.

The present invention relates to shaft packings, and especially to shaft packings of the type disclosed in my Patent Number 1,505,647, patented August 19, 1924.

The object of my invention is to provide certain improvements in a packing of the type disclosed in such patent and for a consideration of what I believe to be novel and my invention, attention is directed to the accompanying description and the claims appended thereto.

Figure 1:
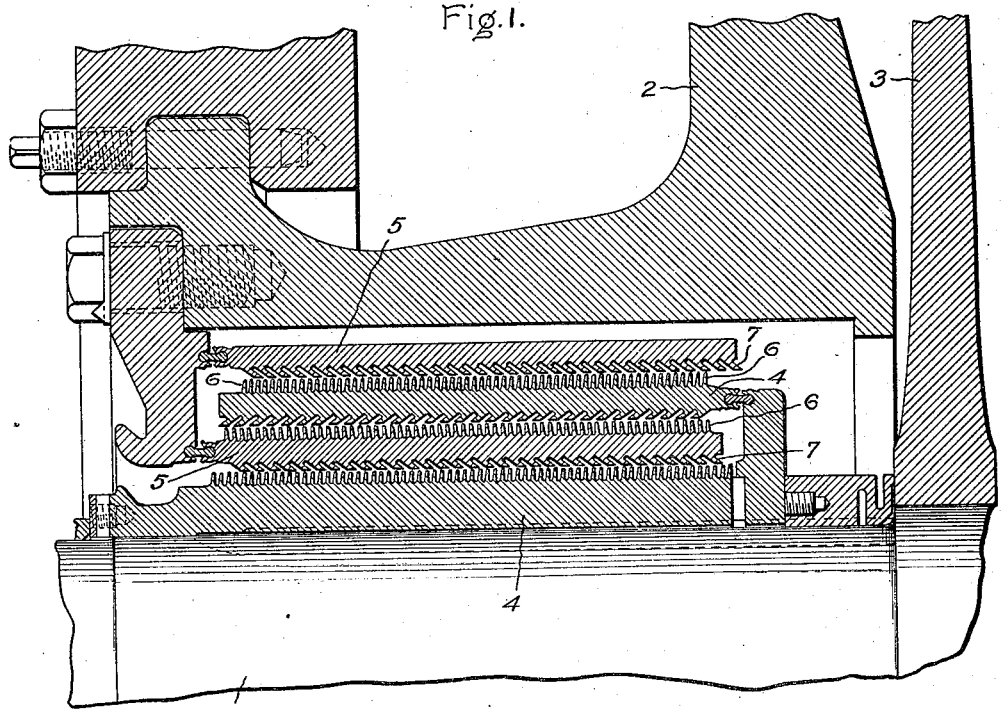
Figure 2:
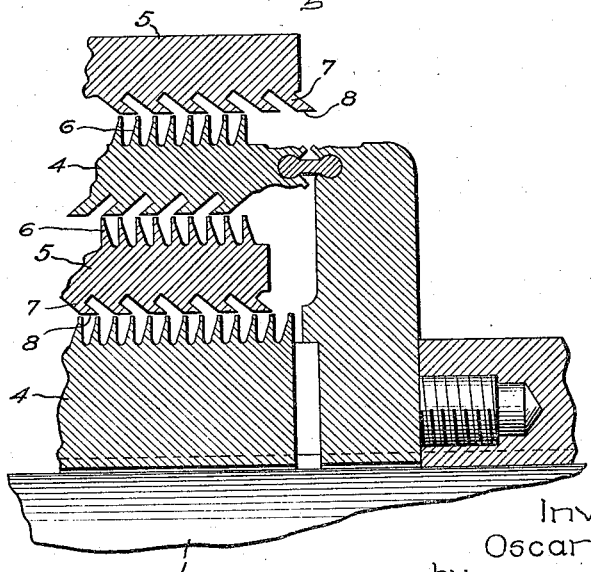

In the drawing, Fig. 1 is a sectional view of a packing embodying my invention, and Fig. 2 is a detail sectional view on a larger scale of a part of the packing.

Referring to the drawing, 1 indicates a rotating shaft, for example, the shaft of an elastic fluid turbine, and 2 a casing or wall through which it passes and between which and the shaft it is desired to prevent leakage. In the present instance wall 2 is the end wall at the high pressure end of a turbine, the first stage wheel of the turbine being indicated at 3. In Fig. 1, only the upper portion of the shaft and packing are shown but it will be understood that the shaft is round as is usual and that the packing extends around it.

The packing comprises packing elements carried by the shaft and casing respectively and provided with cooperating packing teeth which in the one instance are straight and have very thin packing edges and in the other instance are sloping and have flat axially-extending end surfaces against which the teeth having the thin edges pack. The sloping teeth point in a direction opposite to the direction of flow of leakage fluid. In the present instance the packing comprises rings 4 carried by the shaft and rings 5 carried by the casing, such rings being concentric and having their adjacent surfaces provided in the one instance with straight thin edged packing teeth 6 and in the other instance with sloping packing teeth 7 having flat end surfaces 8 against which teeth 6 pack. The packing structure so far described is to be taken as typical of a packing of the character of that disclosed in my above referred to patent.

My present invention relates particularly to the arrangement of the packing teeth. According to my invention I provide a suitable number of the sloping teeth 7 having flat end surfaces 8 and I then provide for cooperating therewith straight teeth 6 the number and arrangement of which is such that there is a plurality of straight teeth adapted to pack against the packing surfaces of each sloping tooth. Preferably I provide two straight teeth for each sloping tooth, such straight teeth being spaced apart a distance substantially equal to the width of the packing surface of the sloping tooth, and in addition I space the sloping teeth 7 apart a distance substantially equal to the width of the packing surfaces 8. With this arrangement, it will be seen that when the rotor moves axially no matter what position it takes, there will be always at least one straight packing tooth 6 in position to pack against each packing surface 8. This will be clear from a consideration of Fig. 2 wherein the rotor is shown in a position such that there is a straight packing tooth at each edge of each packing surface. When the rotor moves axially in either direction from the Fig. 2 position while the one tooth will be moved out of packing relation to the adjacent packing surface, the other tooth will be maintained in packing relation thereto. Furthermore, should the rotor move axially a distance greater than the width of the packing surfaces 8, still packing relation will be maintained because of the fact that the spacing of the sloping teeth 7 is the same as that of the straight teeth 6.

Viewed from another aspect, it may be considered that by my invention I provide in connection with the flat packing surfaces 8 of the sloping packing teeth a plurality of (in the present instance two) complete sets of straight sharp-edged packing teeth, one set or another being always in operative relation to the flat packing surfaces.

It is well understood in connection with the operation of elastic fluid turbines that the rotor is subject to axial movement to a limited extent. By my invention it will be seen that the clearance and the efficiency of the packing is not affected adversely by such axial movement.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. A packing comprising two relatively rotating concentric members, packing teeth on one of said members, said teeth having flat, axially-extending packing surfaces at their ends, and sharp-edged packing teeth on the other of said members which pack against said packing surfaces, said sharp-edged packing teeth being spaced apart a distance not greater than the width of said flat packing surfaces whereby there are at least two sharp-edged packing teeth appurtenant to each flat surface so that when relative axial movement of said concentric members occurs, at least one packing tooth is always in packing relation to each flat surface.

2. A packing comprising two relatively rotating concentric members, packing teeth on one of said members, said packing teeth having flat, axially-extending surfaces at their ends, said teeth being spaced apart a distance equal substantially to the width of said flat surface, and sharp-edged packing teeth on the other of said members which pack against said packing surface, said sharp-edged packing teeth being spaced apart a distance not greater than the width of said flat packing surface, whereby there are at least two sharp-edged packing teeth appurtenant to each flat surface so that when relative axial movement of said concentric members occurs at least one packing tooth will always be in packing relation to each flat surface.

In witness whereof, I have hereunto set my hand this 27th day of September, 1924.

OSCAR JUNGGREN.